No. 619,367. Patented Feb. 14, 1899.
H. H. THOMPSON.
BALL BEARING ADJUSTMENT.
(Application filed June 18, 1898.)
(No Model.) 2 Sheets—Sheet 1.
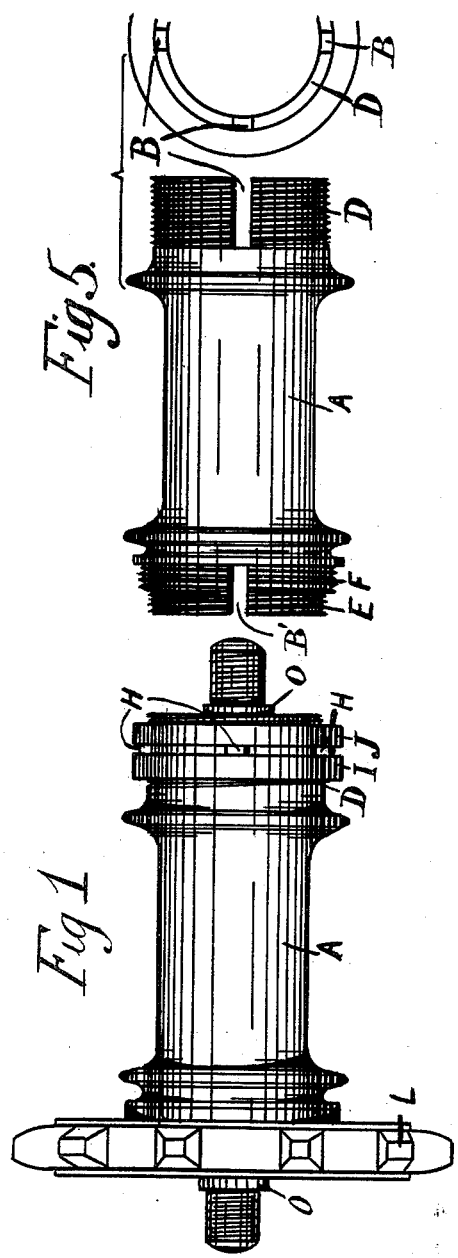
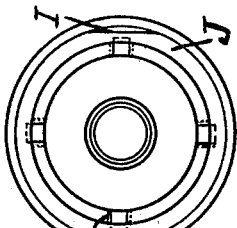
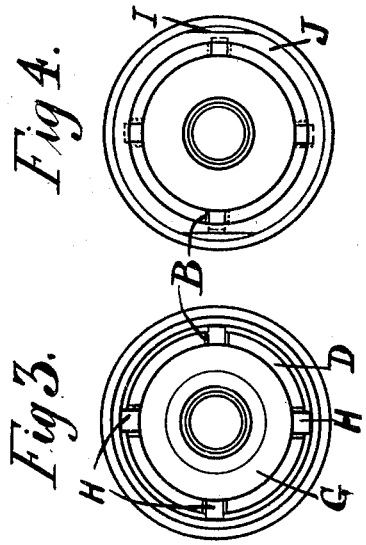
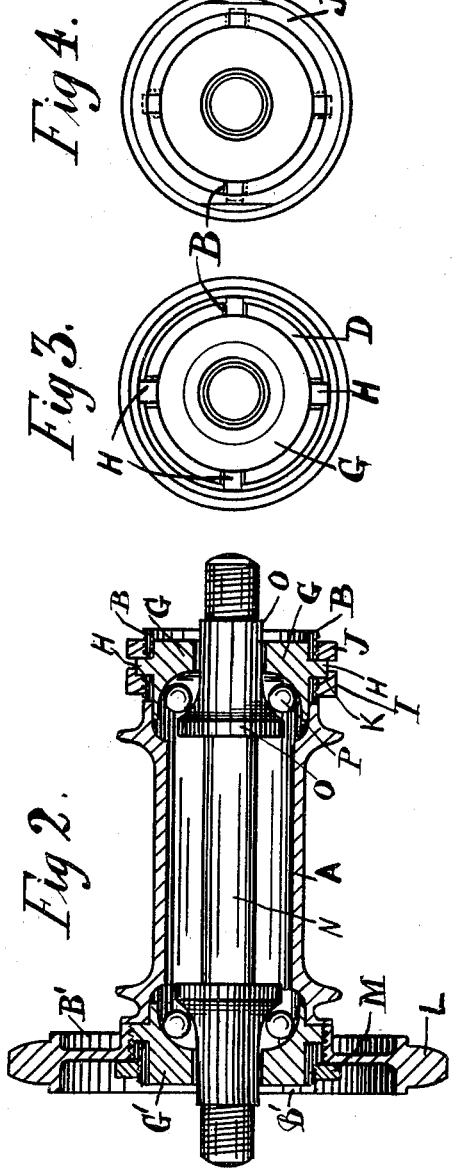
Witnesses:
Inventor.
Herbert H. Thompson.
by Herbert W. P. Jenner.
Attorney.

No. 619,367. Patented Feb. 14, 1899.
H. H. THOMPSON.
BALL BEARING ADJUSTMENT.
(Application filed June 18, 1898.)
(No Model.) 2 Sheets—Sheet 2.
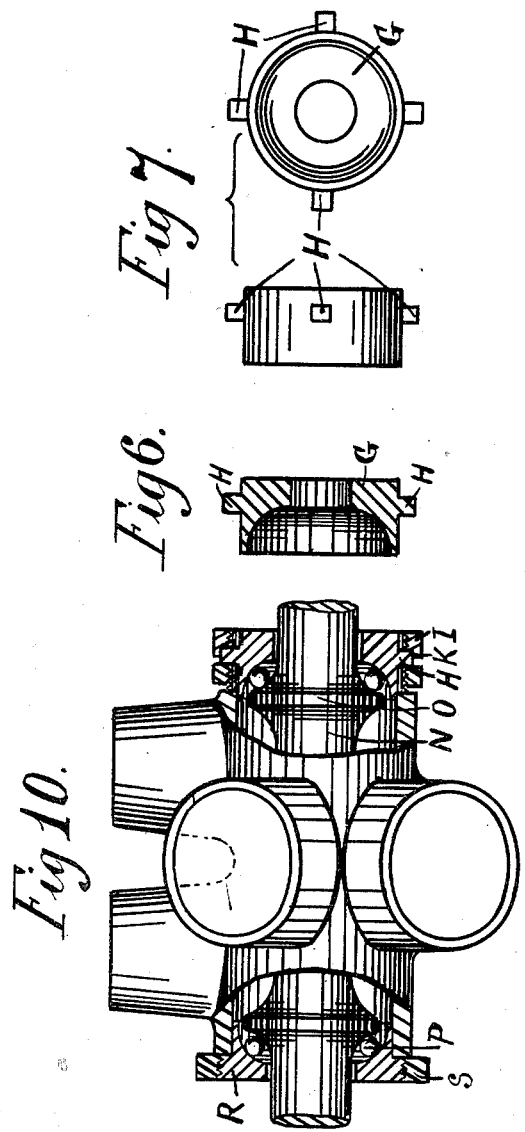
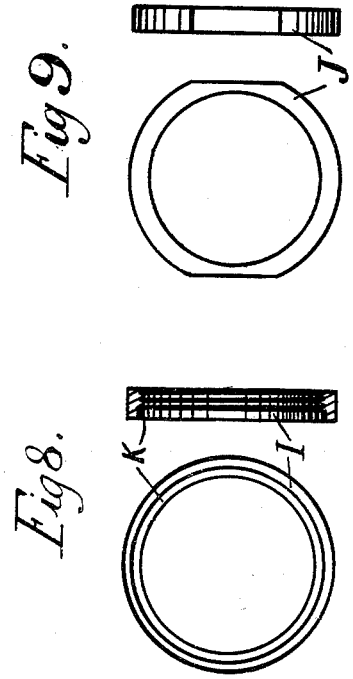

UNITED STATES PATENT OFFICE.

HERBERT HUBAND THOMPSON, OF GRAVELLY HILL, ENGLAND.

BALL-BEARING ADJUSTMENT.

SPECIFICATION forming part of Letters Patent No. 619,367, dated February 14, 1899.

Application filed June 18, 1898. Serial No. 683,831. (No model.)

*To all whom it may concern:*

Be it known that I, HERBERT HUBAND THOMPSON, a subject of Queen Victoria of Great Britain and Ireland, residing at Sunnyside Wheelwright road, Gravelly Hill, in the county of Warwick, England, have invented certain new and useful Improvements in Ball-Bearing Adjustments; and I do hereby declare the following to be a full, clear, and exact description of the invention, such as will enable others skilled in the art to which it appertains to make and use the same.

My invention relates to improvements in ball-bearing adjustments, particularly those used for bicycles; and the object of my improvements is to provide means whereby such bearings may be easily and expeditiously adjusted without in any way altering the adjustment of the forks or other attachments. I attain this object by the means illustrated in the accompanying drawings, in which a bearing is applied to a bicycle rear hub.

Figure 1 is a side view of the wheel-hub. Fig. 2 is a transverse section of the same hub. Figs. 3 and 4 are end views of the hub. Figs. 5, 6, 7, 8, and 9 are detailed parts of my improved bearing adjustment. Fig. 10 is a side elevation, partly in section, of my improved bearing adjustment applied to the bottom bracket of a cycle.

Similar letters refer to similar parts throughout the several views.

The barrel or shell A of the rear hub (shown at Fig. 5) is provided with slots or cut-away parts B, preferably four, though I may use more or less. The end D of the barrel A, I cut with a right or left hand male screw-thread, and the part F with a right-hand screw, and the part E with a left-hand thread. The ball race or cup G (shown separately in section at Fig. 6 and in side elevation and plan at Fig. 7) is provided with projections H, arranged to fit or slide into and project through the slots B at the end D or the slots B' at the ends E and F. The position of these parts is shown clearly at Figs. 3 and 4. The nut or screw-collar I, Fig. 8, is made to screw on the part D of the barrel A, the ball-race G being in its place, as shown at Fig. 2. The projections H take into the recess K of the nut I. The nut or screw-collar J, Fig. 9, is screwed up in its place and locks the projection H in the enlarged part K of the collar I, thus completing the adjustment at that end of the hub. The opposite or fixed end is fitted in a similar manner. The ball-race G' fits into the slots B'. The ends of the projections H are screwed in a manner so that when the chain-wheel L is screwed against the shoulder on the right-hand screw F it also screws onto the ends of the projections H, thus securing them in their place, the lock-nut M being screwed up on the left-hand screw E, thus completing this end of the bearing. The spindle N and the cones O being in their place and the balls P being held in position by the ball-race G, it will be apparent that the adjustment of the bearing may be readily effected by means of the ball-race G and the nuts I, locked therein by the nut J. In the arrangement shown at Fig. 10 a similar adjustment is applied to the bottom bracket-bearing and is effected in the same manner as that in connection with the hub hereinbefore described in the opposite end, if desired. The ball-race R is held in position by the screw-nut S.

My improved adjustment may by slight modification be applied to axle-bearings of motor-cars and other vehicles or any other machines to which it may be adapted without departing from the nature thereof.

What I claim is—

1. In a ball-bearing, the combination, with a hub-barrel provided with an externally-screw-threaded portion at one end having longitudinal slots in it, of a ball-race slidable in the end of the said barrel and provided with lugs which project through the said slots, adjusting-nuts engaging with the said screw-threaded portion and bearing against the opposite sides of the projecting portions of the said lugs, a spindle arranged inside the said barrel and provided with a ball-race, and balls arranged between the said races, substantially as set forth.

2. In a ball-bearing, the combination, with a hub-barrel provided at one end with screw-threaded portions E and F, the portion F being larger in diameter than the portion E, and the said portions having longitudinal slots; of a ball-race slidable in the end of the said barrel and provided with lugs which engage with the said slots and have partial screw-threads on their ends corresponding with the screw-threads of the said portion F, a driving-wheel screwed on the portion F and on the ends of the said lugs, a nut screwed on the portion E and bearing against the said wheel, a spindle arranged inside the said barrel and provided with a ball-race, and balls arranged between the said races, substantially as set forth.

In testimony whereof I affix my signature in the presence of two witnesses.

HERBERT HUBAND THOMPSON.

Witnesses:
WILLIAM HENRY BARACLOUGH,
RICHARD ARTHUR LOMASNEY.